US008285485B2

(12) United States Patent
Montealegre et al.

(10) Patent No.: US 8,285,485 B2
(45) Date of Patent: Oct. 9, 2012

(54) VEHICLE NAVIGATION SYSTEM WITH ROUTE DETERMINATION BASED ON A MEASURE OF SPORTINESS

(75) Inventors: Steven Montealegre, Farmington Hills, MI (US); Robert Haase, White Lake, MI (US); Rhita Boufelliga, Farmington Hills, MI (US)

(73) Assignee: Harman International Industries, Incorporated, Northridge, CA (US)

( * ) Notice: Subject to any disclaimer, the term of this patent is extended or adjusted under 35 U.S.C. 154(b) by 228 days.

(21) Appl. No.: 12/727,101

(22) Filed: Mar. 18, 2010

(65) Prior Publication Data

US 2011/0231086 A1     Sep. 22, 2011

(51) Int. Cl.
    *G08G 1/123* (2006.01)
(52) U.S. Cl. ....................................... 701/532
(58) Field of Classification Search ............... 701/400, 701/532
    See application file for complete search history.

(56) References Cited

U.S. PATENT DOCUMENTS

| 2004/0049339 | A1  | 3/2004  | Kober et al.          |
|--------------|-----|---------|------------------------|
| 2004/0158393 | A1  | 8/2004  | Oonishi et al.         |
| 2004/0236507 | A1* | 11/2004 | Maruyama et al. ......... 701/208 |
| 2006/0041372 | A1* | 2/2006  | Kubota et al. ................. 701/200 |
| 2007/0168119 | A1* | 7/2007  | Mori .............................. 701/207 |
| 2008/0004797 | A1  | 1/2008  | Katzer                 |
| 2009/0037064 | A1* | 2/2009  | Nakamura et al. ............... 701/70 |
| 2009/0222198 | A1  | 9/2009  | Raynaud                |
| 2009/0312942 | A1* | 12/2009 | Froeberg ....................... 701/200 |
| 2010/0082203 | A1* | 4/2010  | Isaji et al. ...................... 701/41 |
| 2010/0100293 | A1* | 4/2010  | Takanami ....................... 701/65 |
| 2011/0046877 | A1* | 2/2011  | Hoffmann ...................... 701/206 |

FOREIGN PATENT DOCUMENTS

| EP | 0487864 A1       | 6/1992  |
| EP | 0747671 A2       | 12/1996 |
| WO | WO 2006042689 A1 | 4/2006  |

\* cited by examiner

*Primary Examiner* — James Trammell
*Assistant Examiner* — Michael D Lang
(74) *Attorney, Agent, or Firm* — The Eclipse Group LLP

(57) ABSTRACT

A system and method is provided for identifying and generating a route that provides a driver with an exhilarating ride. In an example method, the navigation system obtains location data for routes between a starting and ending location. The location data is analyzed by identifying points of inflection of the curved road portion. At least one curved segment is identified as being road portions between the points of inflection. A linear distance, $L_{linear}$, is measured between the points of inflection of the at least one curved segment. A curve depth, H, is measured by identifying the maximum distance between the line between the points of inflection and any point on the curved segment along a perpendicular to the line between points of inflection. A curved segment degree of curviness=$H/L_{linear}$ is calculated and used to determine the measure of curviness of the route.

19 Claims, 14 Drawing Sheets

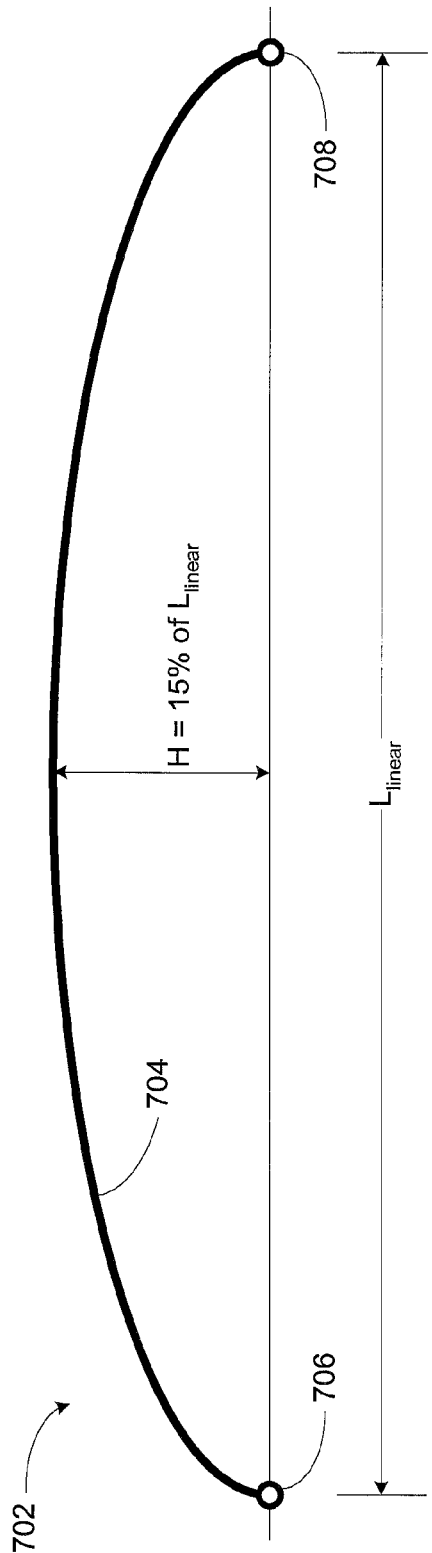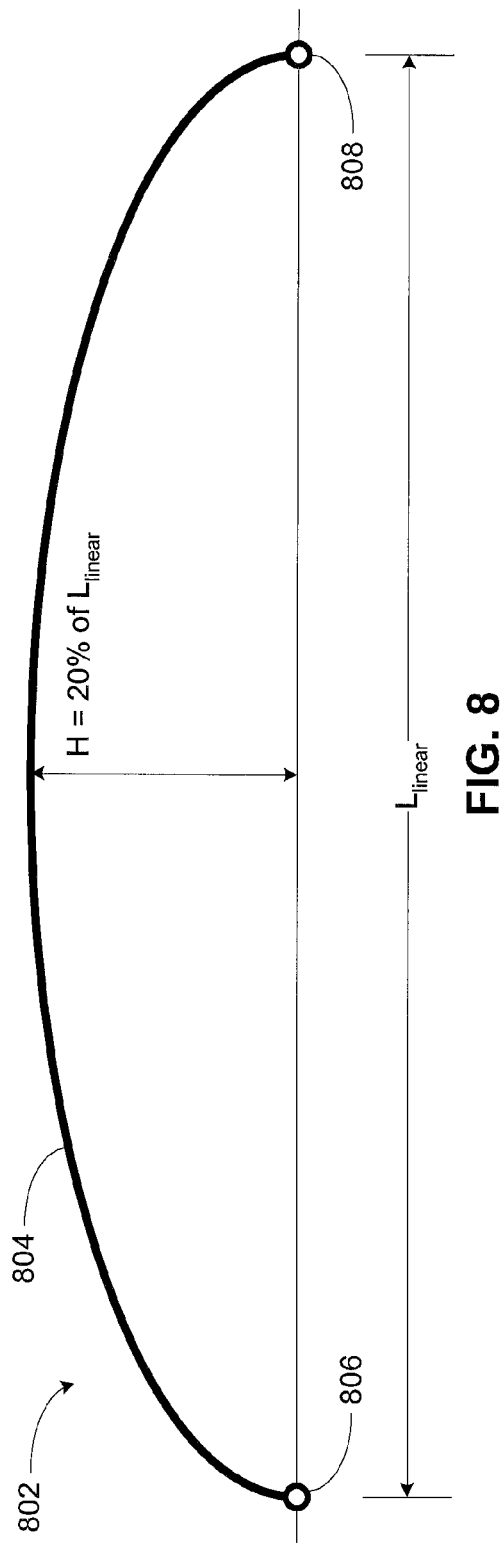

VEHICLE NAVIGATION SYSTEM WITH ROUTE DETERMINATION BASED ON A MEASURE OF SPORTINESS

BACKGROUND

1. Field of the Invention

The invention relates to navigation systems, and more particularly to navigation systems in vehicles.

2. Related Art

Navigation systems are finding increasing use in vehicles to provide a vehicle user, the driver, with navigation instructions that help orient the driver when traveling unknown routes. In general, a navigation system includes a positioning device, which is typically based on a positioning system such as the global positioning system (GPS), for determining the vehicle's position with respect to a digital map representation. Navigation systems also typically include a processing system and suitable hardware and software to generate navigation information and the navigation instructions conveyed to the driver using the vehicle position and user input information such as a user-selected navigation route.

Navigation instructions may be presented to drivers as routes from an originating position to a destination. Navigation systems have evolved to make use of information about the geography between points and may now offer the driver options regarding the routes that may be taken between any two points. For example, a navigation system may use traffic information data that may be obtained from a Traffic Message Channel (TMC). The TMC is a publicly available digital radio data service used for broadcasting information on traffic conditions to suitable receiver devices. The navigation system may use the traffic information to instruct the driver on alternative routes that would avoid unfavorable traffic conditions.

Navigation systems may also provide a user with alternative routes that include features that may be of interest to drivers. For example, points having scenic views, or businesses such as restaurants, gas stations, ATM machines or other facilities that may be of interest to a driver may be provided on a map database. The navigation system may make use of this information provided on map databases and provide alternative routes that include such points of driver interest based on the driver's preferences.

The possible routes between points may include features or characteristics that are of interest to the driver and that may not be included in the map database. For example, a driver of a sports vehicle may prefer to take a longer route to a destination if it has curves, hills, or other characteristics that make a drive fun or exhilarating in a sports vehicle. Characteristics such as the curviness of the road, or the hilliness of the road, are not part of a map database. Such subjective characteristics may vary according to the type of vehicle being driven, or the personal preferences of the driver. Routes based on their "sportiness" are therefore not identified by navigation systems.

There exists a need for navigation systems to provide optional routes to a destination based on the "sportiness" of the routes.

SUMMARY

In view of the above, a method of operating a navigation system in a vehicle is provided. In an example method, the navigation system obtains location data for routes between a starting and ending location. The location data is analyzed by identifying points of inflection of the curved road portion. At least one curved segment is identified as being road portions between the points of inflection. A linear distance, $L_{linear}$ is measured between the points of inflection of the at least one curved segment. A curve depth, H, is measured by identifying the maximum distance between the line between the points of inflection and any point on the curved segment along a perpendicular to the line between points of inflection. A curved segment degree of curviness=$H/L_{linear}$ is calculated and used to determine the measure of curviness of the route.

In another example, a vehicle navigation system includes a curvy route analyzer configured to analyze the route and determine a measure of curviness for the route by identifying points of inflection in curved portions of the route, measuring a curve depth for curved segments between each pair of points of inflection, and using the curve depth to determine the measure of curviness.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The example implementations of the invention described below may be better understood by reference to the following figures. The components in the figures are not necessarily to scale, emphasis instead being placed upon illustrating the principles of the invention. In the figures, like reference numerals designate corresponding parts throughout the different views.

FIG. 7 illustrates an example of the measurements shown in FIG. 5 on another curve segment having slightly more curviness.

FIG. 8 illustrates an example of the measurements shown in FIG. 5 on another curve segment having slightly more curviness.

DETAILED DESCRIPTION

Figure 1:
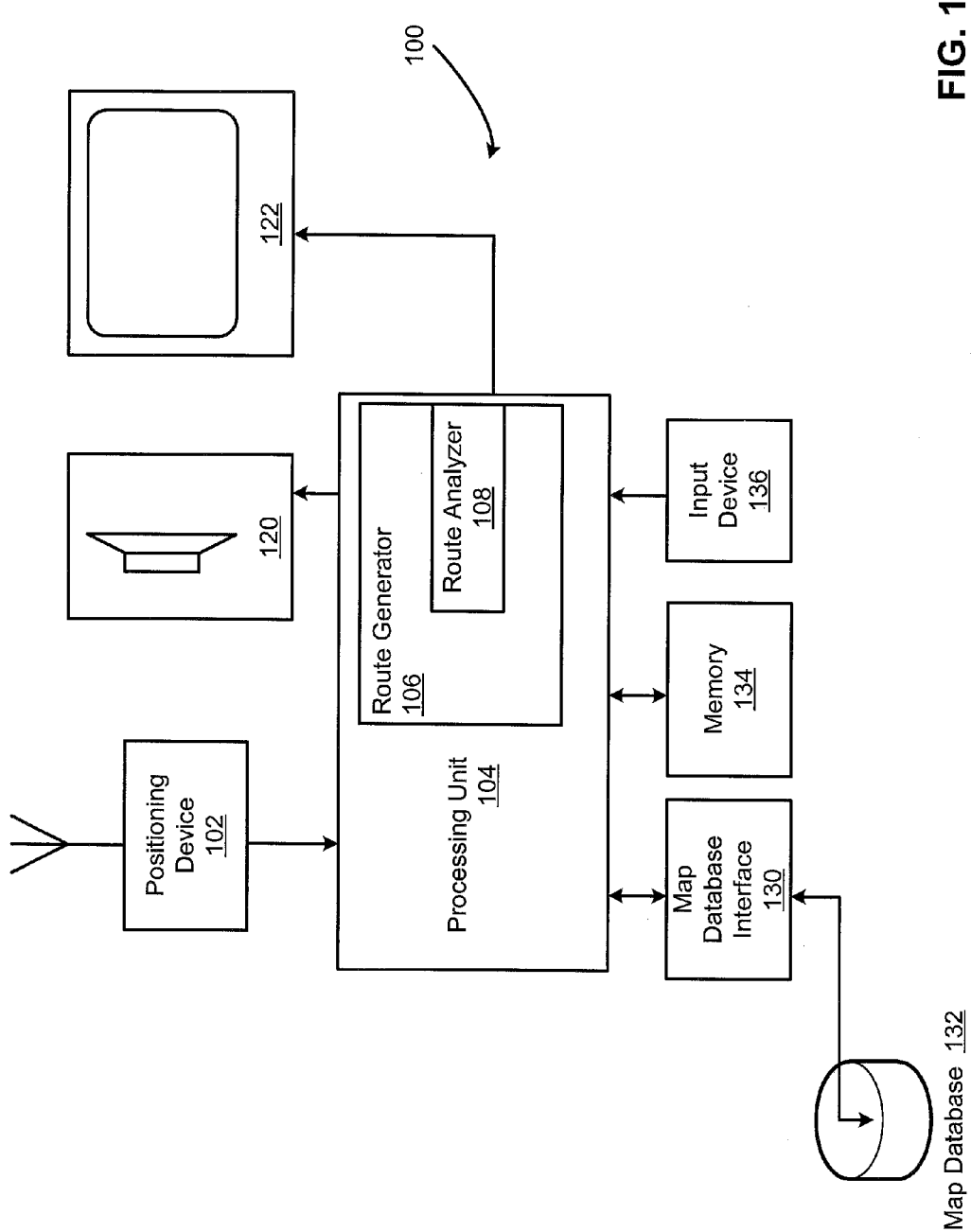
FIG. 1 is a block diagram of an example vehicle navigation system.

FIG. 1 is a block diagram of an example vehicle navigation system 100. The navigation system 100 includes a satellite-based positioning device 102, which determines the position of a vehicle in which the navigation system 100 is installed with respect to a digital map representation. In an example implementation, the positioning device 102 may include a GPS receiver or a comparable satellite positioning system receiver for receiving positioning signals from navigation satellites. The digital map representation may be stored in a map database 132, which may include, for example, a hard disk device, a CD-ROM device, a DVD device, a ROM memory device, or any other suitable storage devices. In addition, rewritable non-volatile memory, such as flash memory, may be provided to store processing information in a flexible way and to maintain the stored information even in the case of a power outage. The map database 132 may be accessed via a map database interface 130, which may be a server-client or a linked connection involving a wireless communication link to a map database 132 in a central location remote from the vehicle. The map database interface 130 may also be a bus, wired or other hardware connection to a storage device in the vehicle.

The navigation system 100 in FIG. 1 generates navigation information on the basis of position data obtained using the positioning device 102. The navigation information may include navigation instructions, which may include for example, indications of which action should be taken in order to navigate the vehicle on a preselected navigation route. For example, the navigation system 100 may display or audibly annunciate messages such as, "turn left", "turn right", or "follow the course of the road." The navigation information may also include warnings relating to the navigation route, such as for example, with respect to abnormal road conditions, speed limits or other conditions. The navigation system 100 may include output devices to present or annunciate the navigation information to the vehicle user. The output devices may include a loudspeaker device 120 and/or an optical display device 122. The loudspeaker device 120 may be a dedicated component of the navigation system 100. The loudspeaker device 120 may also be a component of a vehicle entertainment system, such as a vehicle radio, CD player, MP3 player, tape player, or a combination of such devices. If the navigation system 100 shares use of the loudspeaker device 120 with a vehicle entertainment system, the navigation system 100 includes an interface to permit transmission of the output signals corresponding to navigation information to the vehicle entertainment signal. This may be accomplished via a digital data bus in the vehicle.

The optical display device 122 may be a full graphic display, such as for example, a liquid-crystal display, a thin-film transistor display or a cathode-ray tube display. The optical display device 122 may also be a projection display, such as a head-up display in which optical information is projected onto a windscreen of the vehicle. The optical display device 122 may also be combined with an input device. For example, the optical display device 122 may be configured as a touch-screen device. The optical display device 122 may be a dedicated component of the navigation system, or may be used together with other vehicle systems, such as for example, a multi-media system.

The navigation system 100 includes a processing unit 104 for generating the navigation information. The processing unit 104 may be coupled to the positioning device 102 to receive a position data signal, to the loudspeaker device 120 to provide an acoustical output data signal, and to the optical display device 122 to provide an optical output data signal. The processing unit 104 may also be coupled to the map database interface 130 to receive digital map data and to receive and transmit a processing data signal to and from the map database 132. The processing unit 104 evaluates position data received via the position data signal and digital map data received from the map database interface 130 to generate navigation information to be output to the vehicle user. The output navigation information may be a corresponding acoustical output signal and/or optical output signal.

The processing unit 104 may also be coupled to an input device 136 to provide the vehicle user with control over functions of the processing unit 104. The input device 132 may include suitably designed switches and/or a keyboard. The input device 132 may be used to activate or deactivate the navigation system, to select the navigation route, to select between different display modes. Such modes may include, for example, a mode providing for acoustic output of navigation information only, a mode for optical output of navigation information only, or a mode providing for both acoustical and optical output of navigation information), or other suitable modes.

The processing unit 104 in FIG. 1 includes a route generator 106 and a route analyzer 108. The route generator 106 determines at least one route for the driver to take between a starting location and a destination location. The route generator 106 uses map data obtained from the map database 132 and vehicle location information obtained from the positioning device 102 to generate routes. The route generator 106 may also receive input information provided by the driver via the input device 132. The route generator 106 may, for example, operate in any of a number of modes that determine how the route generator 106 operates to provide routes. The processing unit 104 may provide the driver with options for inputting information that determines the mode of operation of the route generator 106. The processing unit 104 may also use information that may be made available by other sources. For example, the processing unit 104 may be programmed to store information regarding the vehicle, such as model, VIN number, specifications, or any other information that may be useful. The information may be provided during manufacture or during installation of the navigation system 100 in the vehicle. The information may be coded into a navigation system 100 memory 134 at installation, or read in from a source external to the navigation system 100 by an initialization procedure performed by the navigation system 100.

The route generator 106 may generate routes based on a variety of criteria. For example, the route generator 106 may generate routes based on the shortest distance between starting and destination locations, the least amount of time between starting and destination locations, fewest number of stops (due to stop signs and/or stop lights), or any other criteria aided by the contents of the map database. The route generator 106 may also optionally link to a traffic monitoring system and receive traffic conditions along the possible alternative routes between the starting and destination locations.

The route generator 106 may incorporate the traffic information in determining the most efficient route.

The route analyzer 108 in the processing unit 104 in FIG. 1 analyzes routes determined by the route generator 106 to determine characteristics about the route that are not in the map database 132. For example, the route analyzer 108 may determine if the route contains curves and a measure of the curviness of the route. The route analyzer 108 may also analyze the topology of the area of the route to determine elevation changes. The route analyzer 108 may analyze one or more routes between starting and destination locations to inform the driver as to which would provide the more fun or exhilarating ride in a sports vehicle, which may be measured by an exhilaration factor. The route analyzer 108 may use the measure of curviness to determine the extent to which a route may provide the desired exhilaration factor.

Figure 2:
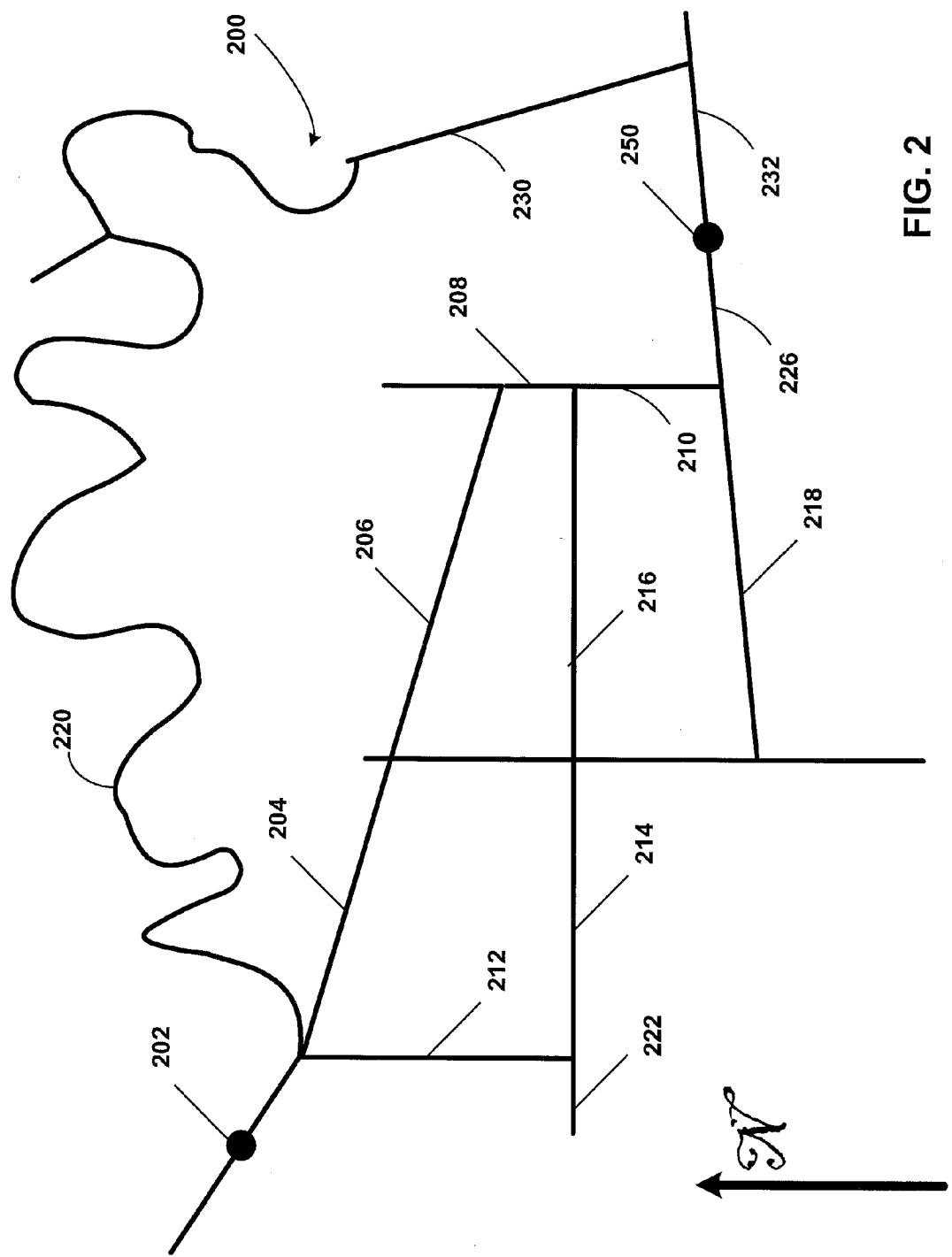
FIG. 2 is an example of a map of an area having roads connecting a starting location and a destination location.

FIG. 2 is an example of a map 200 of an area having roads connecting a starting location 202 and a destination location 250. A compass is shown in the lower left corner of FIG. 2 for purposes of describing the contents of the map 200. The driver's starting location 202 may be the vehicle's current location as determined by the positioning device 102 shown in FIG. 1. The starting location 202 may also be a location entered by the driver if the driver desires to program a starting location 202 that is different from the vehicle's current location. The map 200 in FIG. 2 shows the starting location 202 approaching an intersection of a curvy road 220, a first northwest to southeast ("NWSE") diagonal road segment 204, and a first north-south ("NS") road segment 212. A second NWSE diagonal road segment 206 extends from the first NWSE diagonal road segment 204 proceeding in the same direction until it reaches a second NS road segment 208. The first NS road segment 212 extends to a first east-west ("EW") segment road 214, which is extended eastward by the second EW road segment 216. The second EW road segment 216 ends at a third NS road segment 210, which extends from the second NS road segment 208. The second NS road segment 208 extends south from the east endpoint of the second EW road segment 216 along a third NS road segment 210 to a first southwest northeast ("SWNE") road segment 226, which terminates at the destination location 250.

The curvy road 220 proceeds generally eastward to a third NWSE road segment 230. The third NWSE road segment 230 proceeds to a second SWNE road segment 232. The second SWNE road segment 232 extends toward the destination location 250.

For purposes of illustration, the road generator 106 may be programmed or configured to generate routes based on two criteria:

1. Shortest distance between the starting and destination locations; and
2. Highest exhilaration factor.

Figure 3:
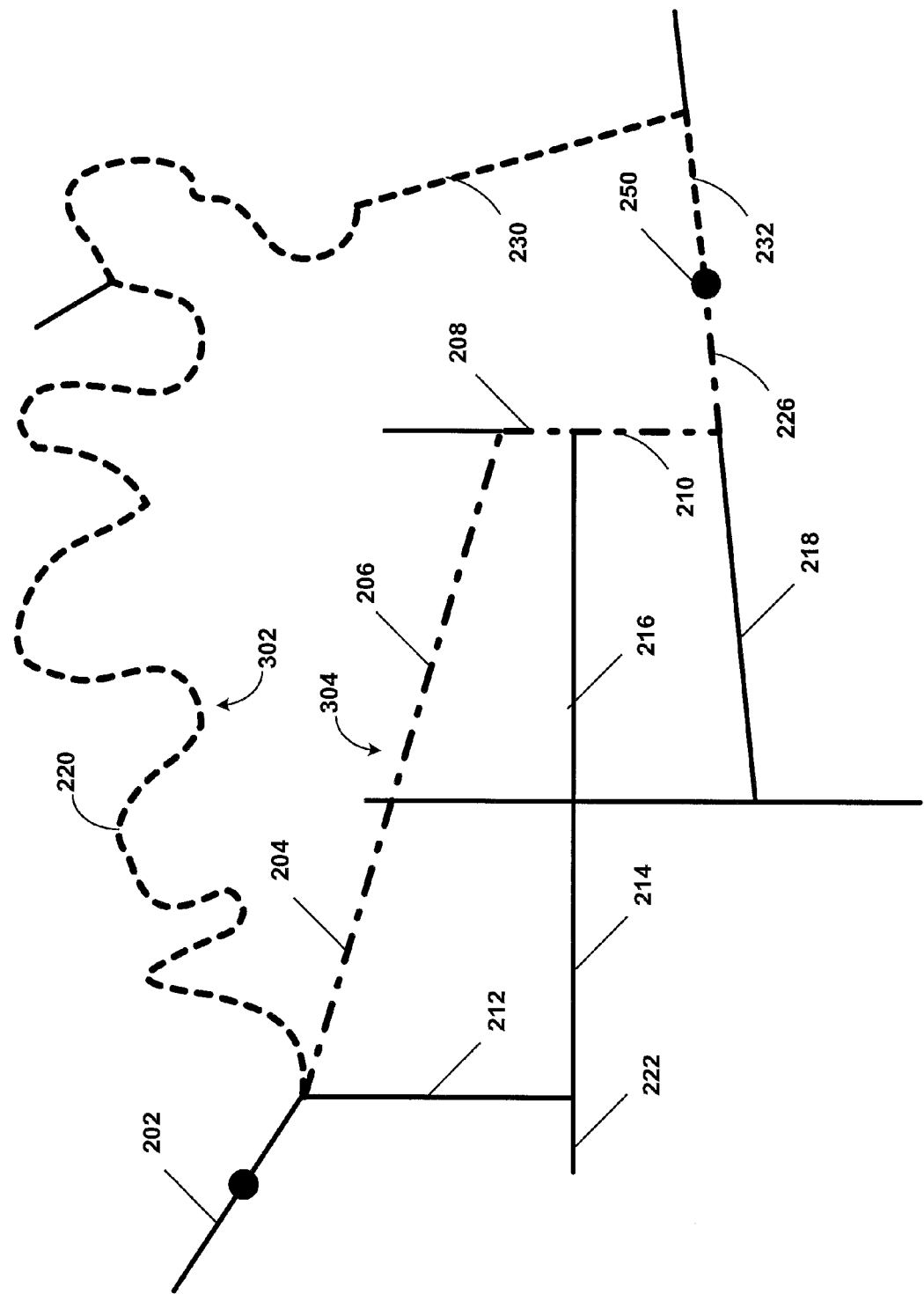
FIG. 3 shows an example of two alternative routes identified by a navigation system in the map of FIG. 2.

FIG. 3 shows an example of two alternative routes identified by a navigation system in the map of FIG. 2. A high exhilaration route 302 is shown in a short dash line pattern and a shortest distance route 304 is shown in a dash-dot line pattern. The high exhilaration route 302 includes the curvy road 220 and the third NWSE segment 230, and the second SWNE road segment 232. The shortest distance route 304 includes the first NWSE diagonal road segment 204, the second NWSE road segment 206, the second NS road segment 208, the third NS road segment 210, and the first SWNE road segment 226. Those of ordinary skill will appreciate that routes according to other criteria may also be determined and provided to the user as an alternative to choose from. In addition, FIG. 2 illustrates one curvy road 220 as an alternative. In other conditions, more than one alternative curvy road may be available to the driver. The user may select among alternative routes based on the exhilaration factor assigned to each alternative. FIGS. 4-14 illustrate examples of how an exhilaration factor may be determined. Those of ordinary skill in the art will appreciate that the description that follows is not limiting and that other implementations may be used.

Figure 4:
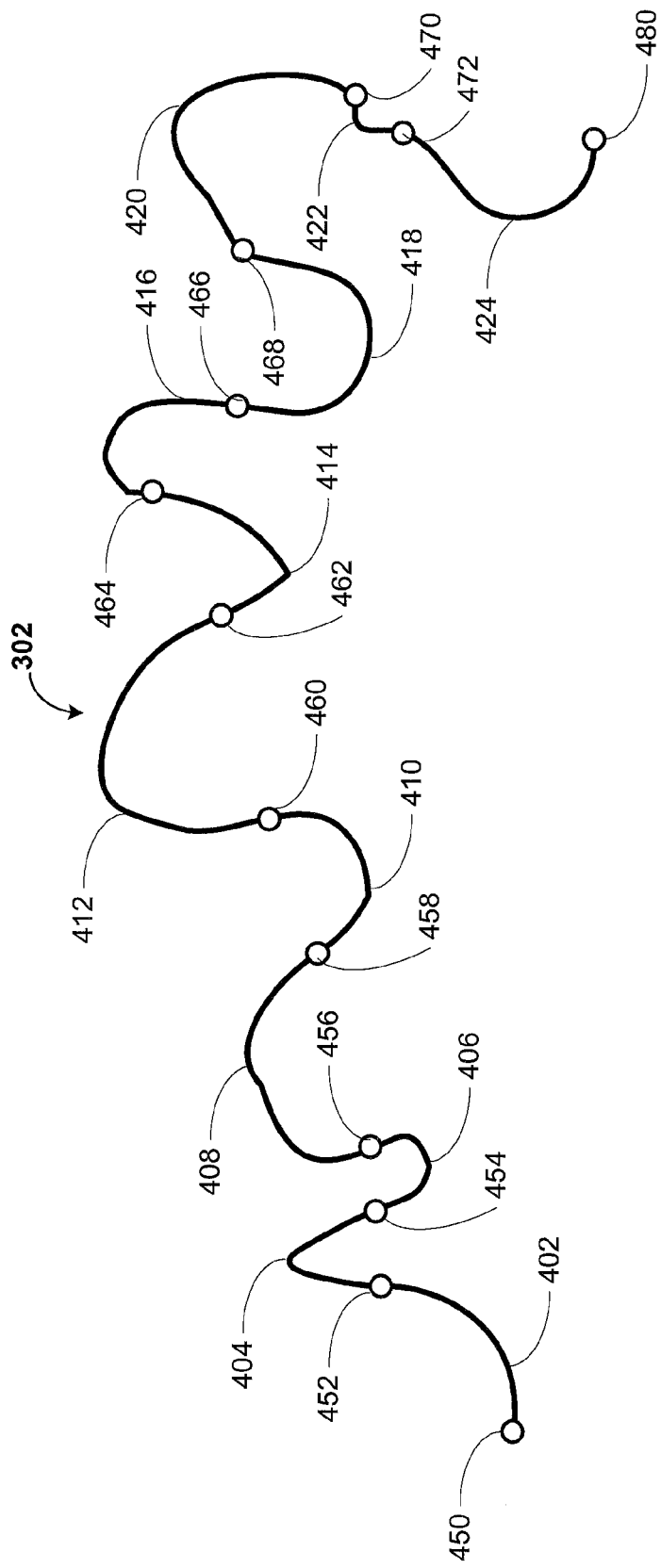
FIG. 4 shows the portion of one of the routes in FIG. 3 having curved roads.

FIG. 4 shows the portion of the high exhilaration route 302 in FIG. 3 having curved roads. The curved road portion of the high exhilaration route 302 in FIG. 4 may be processed by the route analyzer 108 in FIG. 1 as the sequence of positions defining the curved road on the map between a curved road start location 450 and a curved road end location 480. The curved road start and end locations 450, 480 may be locations on the curved road that lead out of the curved road to straight segments of road. The sequence of positions may be grouped together in a suitable data structure for processing. A data reduction algorithm may be used to reduce the quantity of data to be analyzed without distorting the curved shapes on the road.

The curved road in FIG. 4 is divided into curved segments 402, 404, 406, 408, 410, 412, 414, 416, 418, 420, 422, and 424 by identifying a set of points of inflection 452, 454, 456, 458, 460, 462, 464, 466, 468, 470, and 472. The first curved segment 402 includes all of the locations between the first point 450 and the next point of inflection 452 on the curved portion on the high exhilaration route 302. The last curved segment 424 includes all of the locations between the last point of inflection 472 and the curved road end location 480. Each curved segment 404, 406, 408, 410, 412, 414, 416, 418, 420, and 422 between the first curved segment 402 and the last curved segment 424 includes all of the locations between consecutive points of inflection.

The points of inflection 452, 454, 456, 458, 460, 462, 464, 466, 468, 470, and 472 are the points at which one curve ends and the next begins. To illustrate, if the curved road may be plotted as a curve on a graph, the points of inflection would be the points at which the second derivative of the curve on the graph changes signs. For purposes of this description, the curved road start location 450 is understood to be a point of inflection as being the point at which a straight road portion ends and a curved segment begins. Similarly, the curved road end location 480 is understood to be a point of inflection as being the point at which a curved segment ends and a straight road portion begins.

The curved segments 402, 404, 406, 408, 410, 412, 414, 416, 418, 420, 422, and 424 may be processed to determine a measure of exhilaration offered by the curved road. One factor that may be considered in the measure of exhilaration may include the number of curved segments 402, 404, 406, 408, 410, 412, 414, 416, 418, 420, 422, and 424 in the curved road. In one example, a minimum threshold number of curved segments 402, 404, 406, 408, 410, 412, 414, 416, 418, 420, 422, and 424 may be defined and used to determine whether further analysis of the curved segments is to be performed. In another example, each curved segment may be analyzed for a measure of curviness using, for example, the example illustrated in FIGS. 5-13. The measure of curviness for the curved segments in the curved road may be summed to arrive at a total measure of exhilaration. The measure of curviness for the curved segments in the curved road may be averaged to arrive at a total measure of exhilaration. If the route generator 106 in the navigation system 100 in FIG. 1 determines that there are more than one alternative route having curved portions, the total measure of exhilaration for the alternative routes may be compared to one another to rank the routes. The ranked routes may then be displayed to the user for selection, or the navigation system 100 may be programmed to operate in a mode in which the highest ranking route is automatically chosen.

Figure 5:
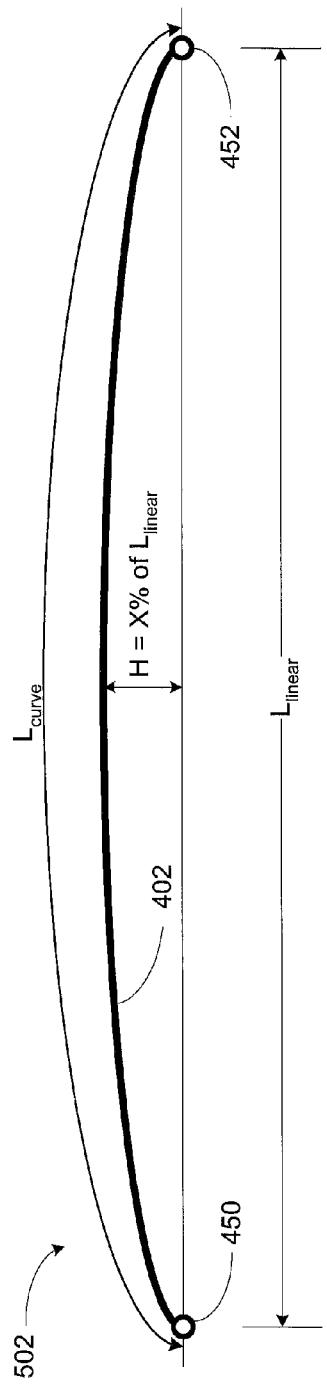
FIG. 5 illustrates an example of measurements taken from the map data corresponding to a curved segment in the portion of the route in FIG. 4.

FIGS. 5-13 illustrate an example method for measuring the curviness of a curved segment. FIG. 5 shows a set measurements 502 that may be taken from the map data corresponding to the first curved segment 402 between the curved road start location 450 and the first point of inflection 452 in the portion of the route shown in FIG. 4. From the location data of the curved segment 402, the following measurements may be taken:

1. $L_{curve}$=the length of road along the curve of the curved segment 402.
2. $L_{linear}$=the length along a straight line between the curved road start location 450 and the first point of inflection 452.
3. H=the maximum distance between the straight line between the curved road start location 450 and the first point of inflection 452 and the curved segment 402 along a line perpendicular to the straight line.
4. X %=$H/L_{linear}$×100%.

It is noted that in FIGS. 5-13, the measure of H is taken at approximately the midpoint of the curved segment 402. However, the contours of actual roads may result in measures of H that fall anywhere on the curved segment.

The route analyzer 108 may analyze each curved segment in a curved route and use the results of each analysis to arrive at a measure of exhilaration. As the value of H increases in relation to the value of $L_{linear}$, the curved segment becomes more curvy. This relation may be used to establish a measure of curviness for the route.

The measure for each curved segment may be determined as X %. The value of X % may be used to assign a curviness factor. The curviness factors of the curved segments may be summed to determine the measure of exhilaration. In another example, the value of $H/L_{linear}$ of all of the curved segments may be summed without calculating a percentage to determine the measure of exhilaration for the entire route.

Figure 6:
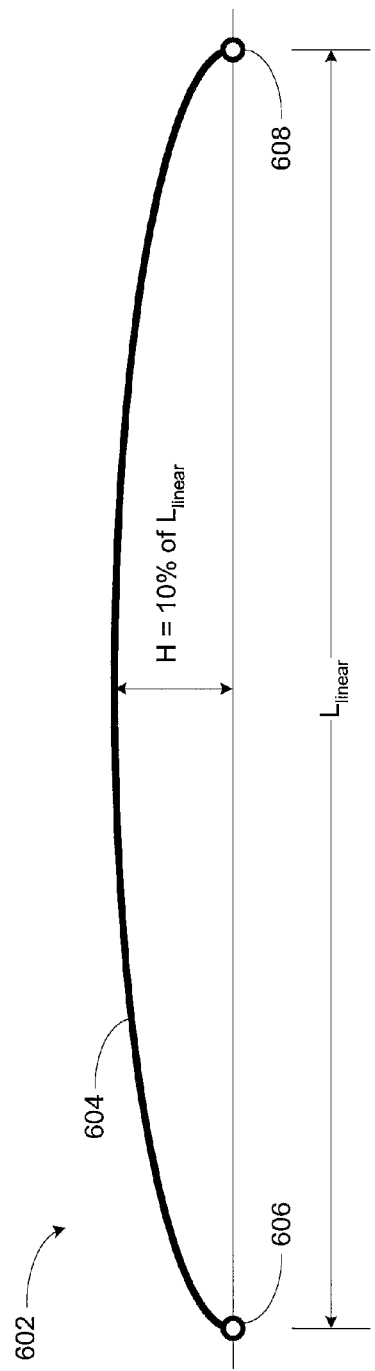
FIG. 6 illustrates an example of the measurements shown in FIG. 5 on another curve segment having slightly more curviness.
Figure 9:
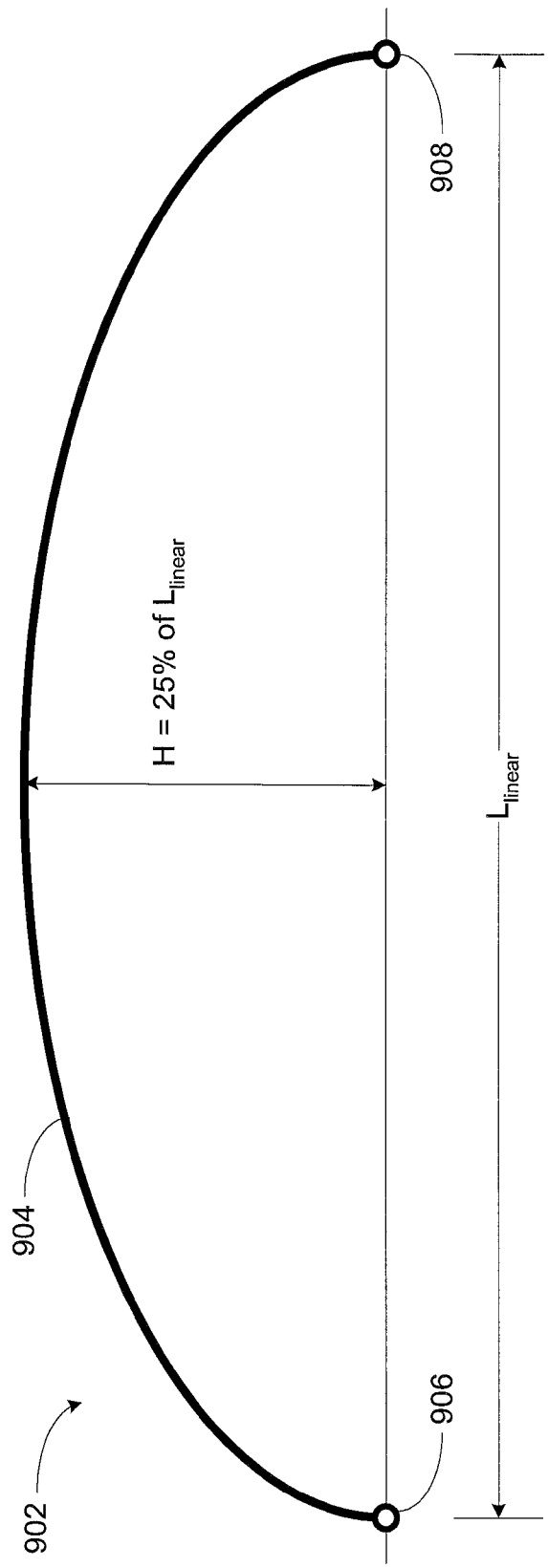
FIG. 9 illustrates an example of the measurements shown in FIG. 5 on another curve segment having slightly more curviness.
Figure 10:
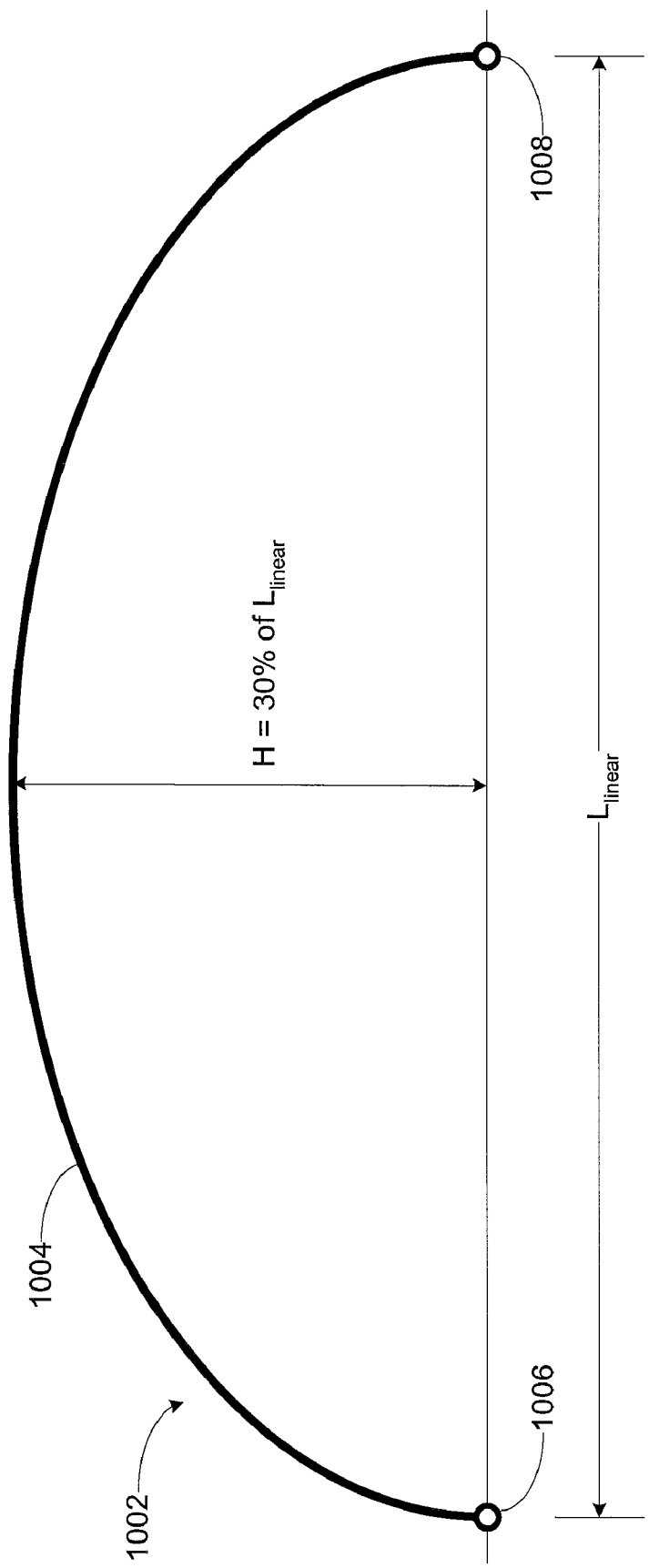
FIG. 10 illustrates an example of the measurements shown in FIG. 5 on another curve segment having slightly more curviness.
Figure 11:
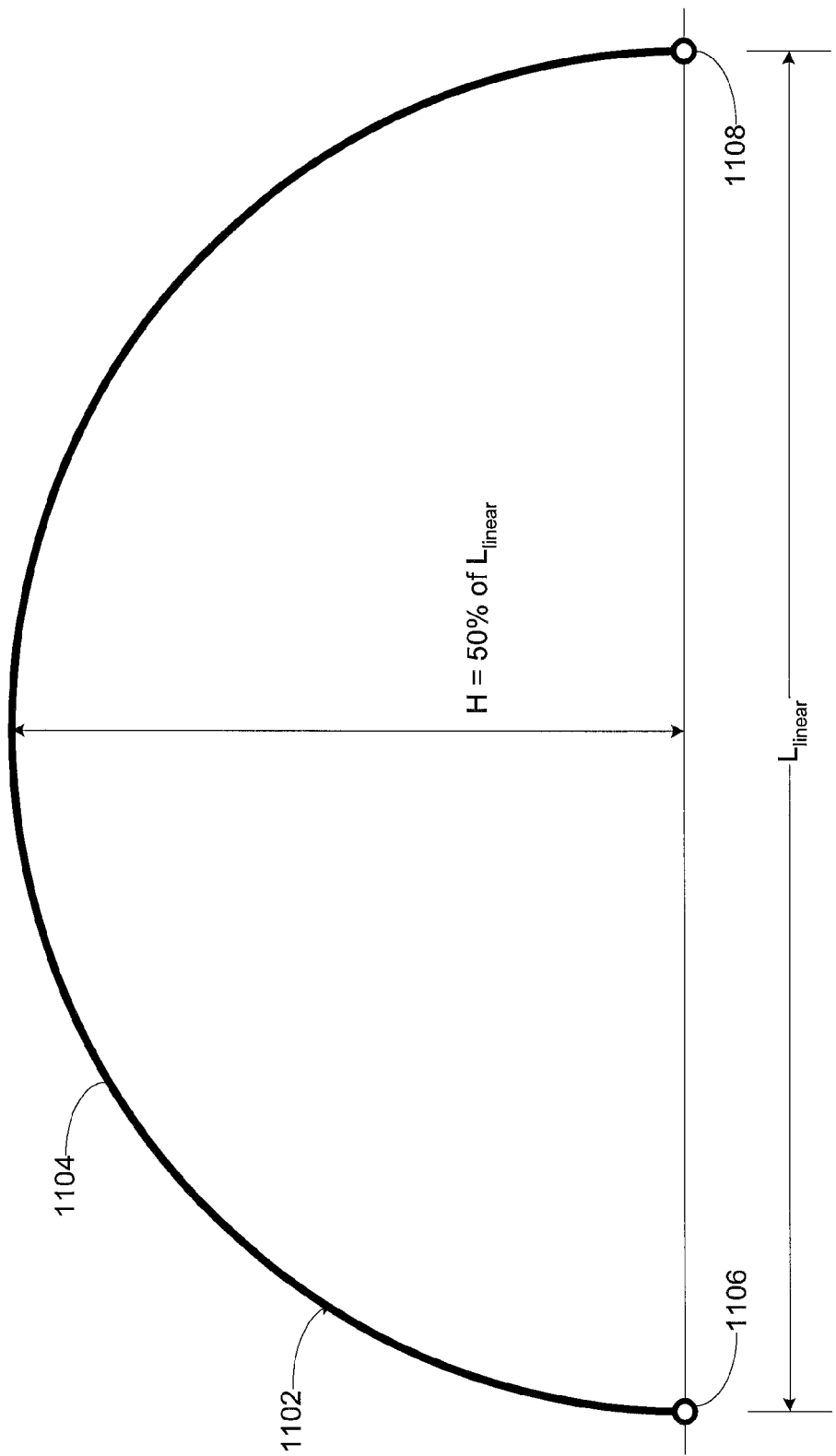
FIG. 11 illustrates an example of the measurements shown in FIG. 5 on another curve segment having slightly more curviness.
Figure 12:
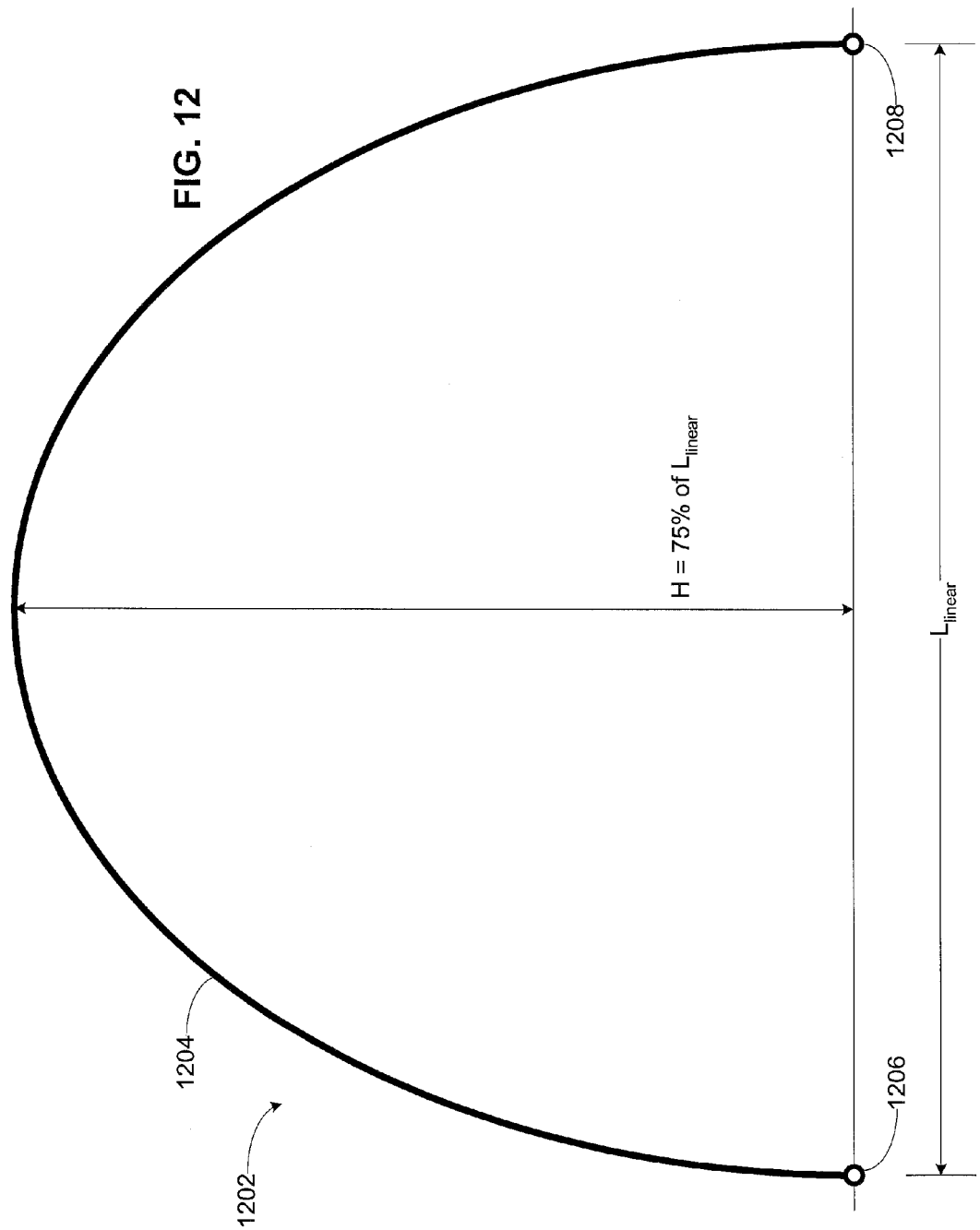
FIG. 12 illustrates an example of the measurements shown in FIG. 5 on another curve segment having slightly more curviness.
Figure 13:
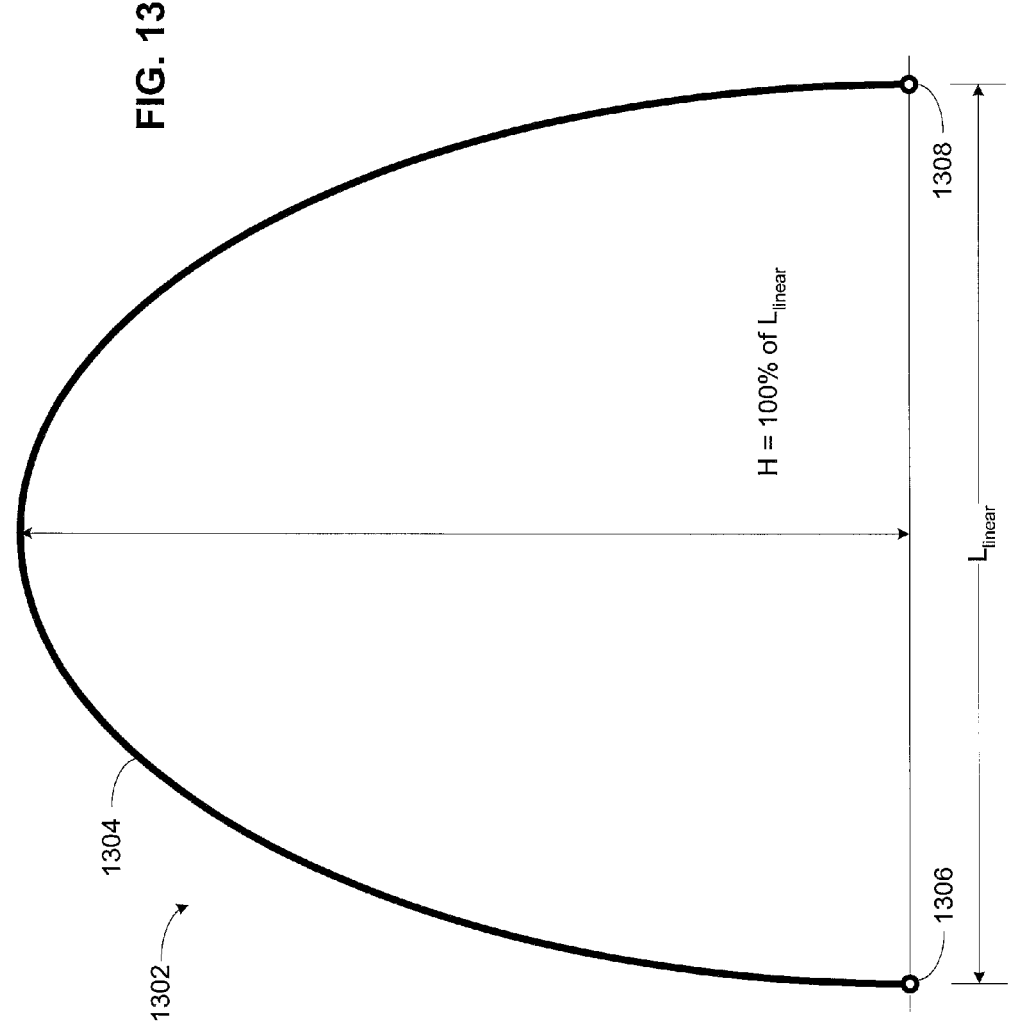
FIG. 13 illustrates an example of the measurements shown in FIG. 5 on another curve segment having slightly more curviness.

FIG. 6 is a graph 602 illustrating measurements of another curved segment 604 that is slightly more curvy than the curve segment 402 in FIG. 5. As shown in FIG. 6, the measure H is 10% of $L_{linear}$. The measures of H and $L_{linear}$ may be based on a scaled representation of the map data, or on actual distances between the locations on the map. It is noted that FIGS. 5-13 are not intended to reflect a map that has been drawn to scale, but rather to illustrate differences between measurements as the curved segments become more curvy. FIG. 7 is a graph 702 illustrating measurements of another curved segment 704 that is slightly more curvy than the curve segment 604 in FIG. 6. The curved segment 704 in FIG. 7 shows the increased curviness where H=15% of $L_{linear}$. FIG. 8 is a graph 802 illustrating measurements of another curved segment 804 that is slightly more curvy than the curve segment 704 in FIG. 7. The curved segment 804 in FIG. 8 shows the increased curviness where H=20% of $L_{linear}$. FIG. 9 is a graph 902 illustrating measurements of another curved segment 904 that is slightly more curvy than the curve segment 804 in FIG. 8. The curved segment 904 in FIG. 9 shows the increased curviness where H=25% of $L_{linear}$. FIG. 10 is a graph 1002 illustrating measurements of another curved segment 1004 that is slightly more curvy than the curve segment 904 in FIG. 9. The curved segment 1004 in FIG. 10 shows the increased curviness where H=30% of $L_{linear}$. FIG. 11 is a graph 1102 illustrating measurements of another curved segment 1104 that is slightly more curvy than the curve segment 1004 in FIG. 10. The curved segment 1104 in FIG. 11 shows the increased curviness where H=50% of $L_{linear}$. FIG. 12 is a graph 1202 illustrating measurements of another curved segment 1204 that is slightly more curvy than the curve segment 1104 in FIG. 11. The curved segment 1204 in FIG. 12 shows the increased curviness where H=75% of $L_{linear}$. FIG. 13 is a graph 1302 illustrating measurements of another curved segment 1304 that is slightly more curvy than the curve segment 1204 in FIG. 12. The curved segment 1304 in FIG. 13 shows the increased curviness where H=100% of $L_{linear}$.

Figure 14:
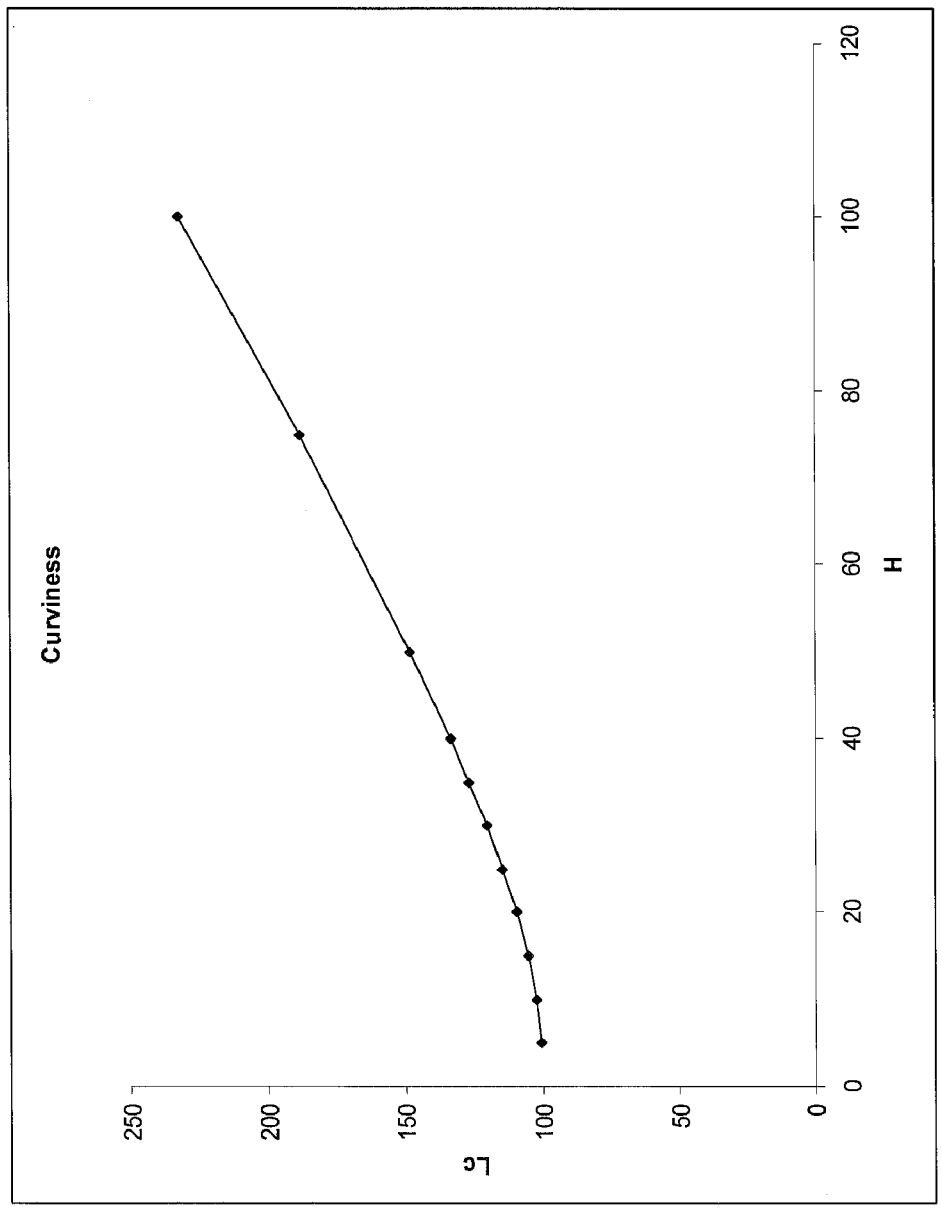
FIG. 14 is a graph of curve lengths versus curve depths based on an example of measurements taken in accordance with the curve segments in FIGS. 5-13.

FIG. 14 is a graph of curve lengths, $L_{curve}$, versus curve depths, H, based on an example of measurements taken in accordance with the curve segments in FIGS. 5-13. The graph in FIG. 14 may be used to determine a threshold value of H that would reflect a minimum significance of curviness for a given curve segment. The threshold value of H may be dependent on a variety of factors such as the vehicle model, on user input or on any other suitable factor. In one example, the threshold may be set at the value of H at which the curve begins to become linear, which in FIG. 14 is at about H=25. The graph in FIG. 14 illustrates one example of how curviness may be analyzed. In another example, the value of $L_{linear}$ may be plotted against H.

Figure 15:
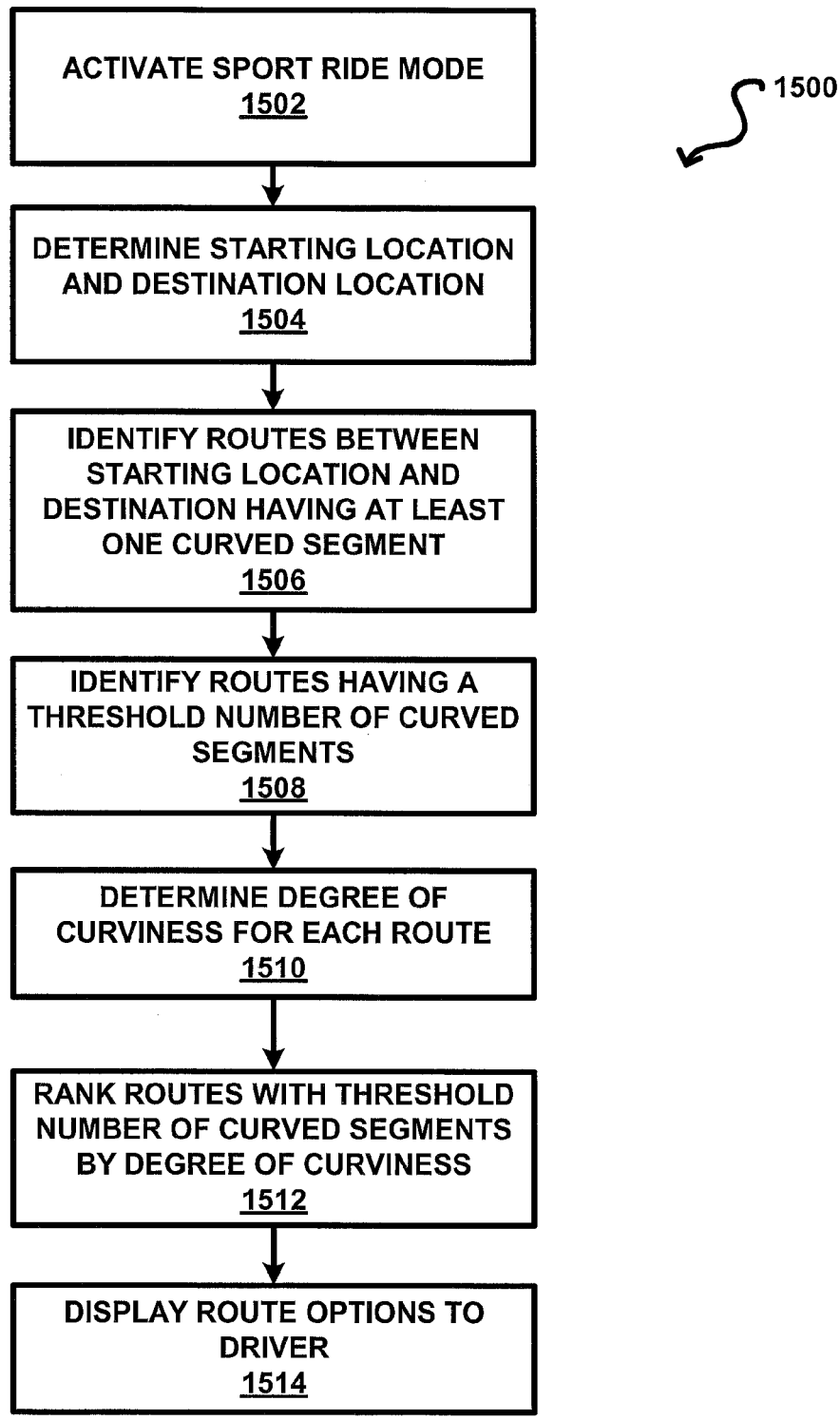
FIG. 15 is a flowchart of an example method for determining alternative routes based on degree of curviness.

FIG. 15 is a flowchart of an example method 1500 for determining alternative routes based on degree of curviness. The example method 1500 illustrated in FIG. 15 may be implemented during route analysis in a process for determining routes between a selected starting location and a destination location. The example method 1500 may be performed at any time during route determination.

At step 1502 in FIG. 15, a sport ride mode may be activated to enable calculation of the exhilaration factor. The mode may be activated manually via an input device 136 (in FIG. 1). The mode may also be a "pop-up" option that prompts the user for selection if curvy routes are found during route generation.

At step 1504, a starting location and a destination location is identified. Route generation will determine possible routes that may be taken between the starting and destination locations. At step 1506, the routes having at least one curved segment are identified. At step 1508, a threshold number of curved segments may be used to minimize the potential lists to only those curved segments having a sufficient number of curved segments to be considered exhilarating. At step 1510, a degree of curviness is determined for each route. The degree of curviness may be determined using examples of measurements described above with reference to FIGS. 5-13. An example method is described below with reference to FIG. 16. At step 1512, the curvy routes having a threshold number of curved segments are ranked by degree of curviness. At step 1514, the curvy route options are displayed to the user. The user may be prompted to select a curvy route or continue on a route meeting another or default criteria.

Figure 16:
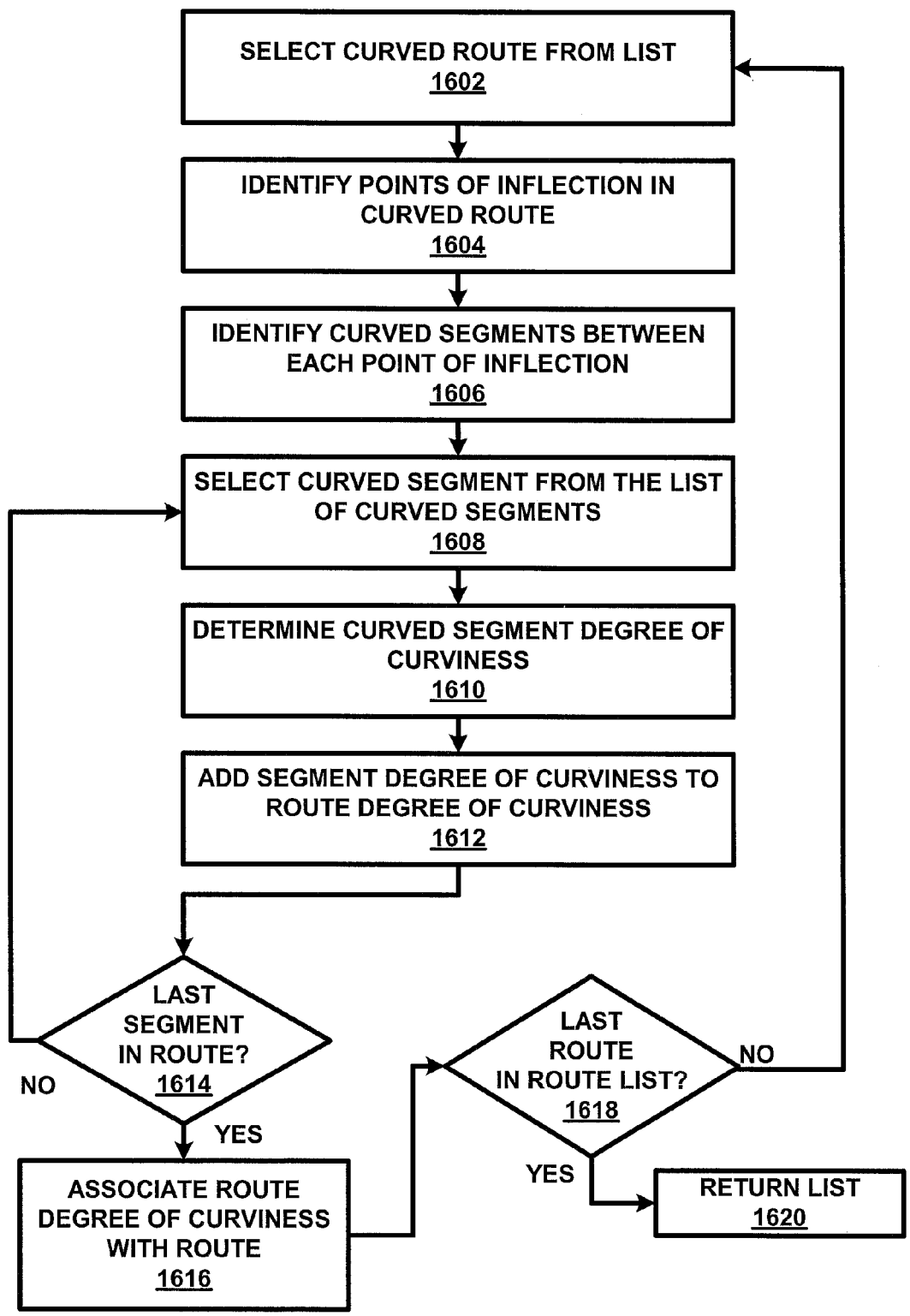
FIG. 16 is a flowchart of an example method for determining the degree of curviness for a route having curves.

FIG. 16 is a flowchart of an example method for determining the degree of curviness for routes having curves. The example method may be used to provide a metric for choosing a route based on its potential for providing an exhilarating ride. At step 1602, a curved route is selected from a list or a set of routes having curved portions. The curved route may be processed as described above with reference to FIG. 3. At step 1604, the route is analyzed to determine the points of inflection along the curved route. The route is then divided into a set of curved segments between consecutive points of inflection at step 1606. At step 1608, a curved segment is selected from the set of curved segments. At step 1610, a degree of curviness is determined for the curved segment. For example, the degree of curviness may be determined by measuring the H-depth of the curved segment and $L_{linear}$—the length of a line between the points of inflection. The length of the curve, $L_{curve}$, may also be measured. The degree of curviness may be the ratio $H/L_{linear}$. The degree of curviness may also be X % $H/L_{linear} \times 100\%$. Other measures for the degree of curviness may be determined using the H, $L_{linear}$, and $L_{curve}$ measurements. For purposes of illustration, the degree of curviness is the ratio $H/L_{linear}$. A route degree of curviness may be maintained for the route by adding the degree of curviness for each curved segment as shown at step 1612. At decision block 1614, the curved segment list is checked to determine if the last curved segment in the list has been, processed. If 'NO,' the next curved segment is selected from the list at step 1608. If 'YES,' the resulting route degree of curviness is associated, or linked to the curvy route processed as shown at step 1616. The route list is then checked at decision block 1618, to determine if the processed route was the last route on the list of curvy routes. If 'YES,' the list of routes with their associated route degrees of curviness is returned and the method exited at step 1620. If 'NO,' the next curvy route is selected from the list at step 1602.

Example systems and methods have been described for determining the extent to which a route determined by a navigation system is curvy. The example systems and methods above have been described for purposes of providing information to the driver about roads that may provide an exhilarating ride. It is to be understood that the above systems and methods may also be used to provide warning regarding hazardous road conditions where the curves in a road present potential road hazards. Such applications may be used by a navigation system that uses weather conditions to provide customized warnings when the driver is approaching a curved road under adverse weather conditions. Example systems and methods such as those described above may also be customized according to particular vehicles according to their specifications. It is also noted that the elevation changes in the road may also be used as a factor in determining a measure of exhilaration along with the measure of curviness.

It will be understood, and is appreciated by persons skilled in the art, that one or more processes, sub-processes, or process steps described in connection with FIGS. 1-16 may be performed by hardware and/or software. If the process is performed by software, the software may reside in software memory (not shown) in a suitable electronic processing component or system such as, one or more of the functional components or modules schematically depicted in FIG. 1. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for determining a measure of curviness of a route having a curved road portion configured for operation in a navigation system, the method comprising:
   determining, using a processor, location data for the curved road portion from map data retrieved from a map database;
   identifying points of inflection from the location data of the curved road portion;
   identifying at least one curved segment as road portions between the points of inflection;
   measuring a linear distance, $L_{linear}$, between the points of inflection of the at least one curved segment;
   measuring a curve depth, H, by identifying the maximum distance between the line between the points of inflection and any point on the curved segment along a perpendicular to the line between points of inflection;
   calculating a curved segment degree of curviness=$H/L_{linear}$; and
   using the curved segment degree of curviness to determine the measure of curviness of the route.

2. The method of claim 1 where the curved road portion includes a plurality of curved segments, the method further including:
   measuring the linear distance $L_{linear}$ and the curve depth H for each remaining curved segment in the curved road portion;
   calculating the curved segment degree of curviness=$H/L_{linear}$ for each remaining curved segment in the curved road portion; and
   using the curved segment degree of curviness for each curved segment in the curved road portion to determine the measure of curviness for the curved road portion.

3. The method of claim 2 further comprising:
   expressing the curved segment degree of curviness as:

$X\% = H/L_{linear} \times 100\%$.

4. The method of claim 1 further comprising:
   after identifying the points of inflection, determining a number of curved segments by adding the number of road portions between each consecutive pair of points of inflection; and
   using the number of curved segments to determine the measure of curviness for the curved road portion.

5. The method of claim 1 further comprising:
   after the step of determining the location data for the curve road portions, reducing the data volume of the location data by removing locations between selected points using a predetermined scale.

6. A method for determining a measure of sportiness for a route for operation in a navigation system, the method comprising:

determining location data for a curved road portion of the route from map data retrieved from a map database;

identifying points of inflection from the location data of the curved road portion;

identifying a plurality of curved segment as road portions between the points of inflection;

measuring a linear distance, $L_{linear}$, between the points of inflection of the plurality of curved segments;

for each curved segment, measuring a curve depth, H, by identifying the maximum distance between the line between the points of inflection and any point on the curved segment along a perpendicular to the line between points of inflection;

for each curved segment, calculating a curved segment degree of curviness=$H/L_{linear}$; and when the curved segment degree of curviness has been calculated for each curved segment, combining the curved segment degrees of curviness for the plurality of curved segments to determine the measure of sportiness of the route.

7. The method of claim 6 where the step of combining the curved segments comprises:

adding the curved segment degrees of curviness to determine a sum of the degrees of curviness; and using the sum of the degrees of curviness as the measure of sportiness.

8. The method of claim 6 further comprising:

calculating a measure of curviness as:

measure of curviness=X %=$L_{linear}$×100% for each curved segment; and using an average of X % for all of the curved segments as the measure of sportiness.

9. The method of claim 6 further comprising:

after identifying the curved segments, determining a number of curved segments by adding the number of road portions between each consecutive pair of points of inflection;

using the number of curved segments to determine the measure of sportiness for the curved road portion.

10. The method of claim 9 where the number of curved segments is compared to a threshold number of curved segments for a sporty route, the method comprising:

identifying the route as being not sporty if the number of curved segments is not greater than the threshold.

11. The method of claim 6 further comprising:

after the step of determining the location data for the curve road portions, reducing the data volume of the location data by removing locations between selected points using a predetermined scale.

12. The method of claim 6 further comprising:

identifying at least one more route having a curvy portion; and for each at least one more route having curvy portion, performing the steps of:

determining location data for a curved road portion of the route from map data retrieved from a map database;

identifying points of inflection from the location data of the curved road portion;

identifying a plurality of curved segment as road portions between the points of inflection;

measuring a linear distance, $L_{linear}$, between the points of inflection of the plurality of curved segments;

for each curved segment, measuring a curve depth, H, by identifying the maximum distance between the line between the points of inflection and any point on the curved segment along a perpendicular to the line between points of inflection;

for each curved segment, calculating a curved segment degree of curviness=$L_{linear}$; and when the curved segment degree of curviness has been calculated for each curved segment, combining the curved segment degrees of curviness for the plurality of curved segments to determine the measure of sportiness of the route; and providing the driver with alternative curvy routes and corresponding measures of sportiness.

13. A navigation system comprising:

a processing unit;

an input device;

a display device;

a map database containing location data;

a route generator configured to determine a route between a first and second location, the route generator configured to provide the driver with at least one route;

a curvy route analyzer configured to analyze the route and determine a measure of curviness for the route by identifying points of inflection in curved portions of the route, measuring a curve depth for curved segments between each pair of points of inflection, and using the curve depth to determine the measure of curviness, the curve route analyzer being configured to determine the curve depth by:

measuring a linear distance, $L_{linear}$, between the points of inflection of one of the curved segments; and identifying the maximum distance between the line between the points of inflection and any point on the curved segment along a perpendicular to the line between points of inflection.

14. The navigation system of claim 13 where the curvy route analyzer is configured to determine location data for the route from map data retrieved from the map database.

15. The navigation system of claim 13 where the curvy route analyzer is configured to determine the measure of curviness for the route by:

calculating a curved segment degree of curviness=$H/L_{linear}$; and using the curved segment degree of curviness for each curved segment to determine the measure of curviness of the route.

16. The navigation system of claim 15 where the curvy route analyzer is configured to determine the measure of curviness of the route by adding the curved segment degree of curviness for all of the curved segments in the curved portion of the route.

17. The navigation system of claim 15 where the curvy route analyzer is configured to determine the measure of curviness of the route by averaging the curved segment degree of curviness for all of the curved segments in the curved portion of the route.

18. The navigation system of claim 17 where the curvy route analyzer is configured to express the curved segment degree of curviness as:

X %=$L_{linear}$×100% before determining the average of the curved segment degrees of curviness.

19. The navigation system of claim 13 where the curvy route analyzer is configured to:

determine a number of curved segments by counting road portions between pairs of points of inflection;

comparing the number of curved segments to a minimum threshold for a sporty route; and if the number of, curved segments is greater than the minimum threshold, continuing with determining the curve depth and the measure of curviness of the route.

* * * * *